(12) United States Patent
Cho et al.

(10) Patent No.: US 12,497,047 B2
(45) Date of Patent: Dec. 16, 2025

(54) VEHICLE CONTROLLING METHOD, COMPUTER READABLE STORING MEDIUM WITH A COMPUTER PROGRAM CODE STORED THEREIN, AND VEHICLE HAVING A CONTROLLER ACCORDING TO THE SAME

(71) Applicants: HYUNDAI MOTOR COMPANY, Seoul (KR); KIA CORPORATION, Seoul (KR)

(72) Inventors: Jin Kyeom Cho, Suwon-si (KR); Joon Young Park, Seoul (KR); Sung Deok Kim, Seongnam-si (KR); Sang Hun Jung, Suncheon-si (KR); Jin Uk Jeong, Hwaseong-si (KR); Dae Ro Park, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 203 days.

(21) Appl. No.: 18/239,917

(22) Filed: Aug. 30, 2023

(65) Prior Publication Data
US 2024/0140436 A1 May 2, 2024

(30) Foreign Application Priority Data
Nov. 2, 2022 (KR) .......... 10-2022-0144718

(51) Int. Cl.
| | | |
|---|---|---|
| *B60W 30/192* | (2012.01) | |
| *B60K 6/387* | (2007.10) | |
| *B60K 6/40* | (2007.10) | |
| *B60W 10/02* | (2006.01) | |

(Continued)

(52) U.S. Cl.
CPC .......... *B60W 30/192* (2013.01); *B60K 6/387* (2013.01); *B60K 6/40* (2013.01); *B60W 10/02* (2013.01); *B60W 10/08* (2013.01); *B60W 20/40* (2013.01); *B60W 2510/0208* (2013.01); *B60W 2510/0225* (2013.01); *B60W 2510/0638* (2013.01); *B60W 2510/081* (2013.01); *B60W 2710/021* (2013.01); *B60W 2710/083* (2013.01); *B60Y 2200/92* (2013.01)

(58) Field of Classification Search
CPC .... B60W 30/192; B60W 10/02; B60W 10/08; B60W 20/40; B60W 2510/0208; B60W 2510/0225; B60W 2510/0638; B60K 6/387; B60K 6/40
USPC .......................................................... 701/22
See application file for complete search history.

(56) References Cited

U.S. PATENT DOCUMENTS

| | | | |
|---|---|---|---|
| 2012/0245781 A1* | 9/2012 | Kanamori | B60L 58/24 180/65.265 |
| 2017/0334447 A1* | 11/2017 | Bang | B60W 10/08 |
| 2024/0140436 A1* | 5/2024 | Cho | B60W 10/08 |

* cited by examiner

*Primary Examiner* — Yazan A Soofi
(74) *Attorney, Agent, or Firm* — Morgan Lewis & Bockius LLP (57) ABSTRACT

A controlling method for a vehicle which comprises an engine, a driving motor connected with the engine, a first clutch connected between the engine and the driving motor, a start motor connected with the engine, a transmission connected with the driving motor, and a second clutch connected between the driving motor and the transmission, comprises synchronizing speeds of the engine and the driving motor, and adjusting a torque of the start motor to release baulking which occurs while a connection state of the first clutch is switched to another connection state upon the speeds of the engine and the driving motor being synchronized.

19 Claims, 9 Drawing Sheets

(51) Int. Cl.
*B60W 10/08* (2006.01)
*B60W 20/40* (2016.01)

VEHICLE CONTROLLING METHOD, COMPUTER READABLE STORING MEDIUM WITH A COMPUTER PROGRAM CODE STORED THEREIN, AND VEHICLE HAVING A CONTROLLER ACCORDING TO THE SAME

CROSS-REFERENCE TO RELATED APPLICATION

The present application claims priority to Korean Patent Application No. 10-2022-0144718, filed on Nov. 2, 2022 in the Korean Intellectual Property Office, the entire contents of which is incorporated herein by reference in its entirety.

TECHNICAL FIELD

The present disclosure relates to a control method for driving a vehicle by an engine and a driving motor.

BACKGROUND

In general, a hybrid vehicle refers to a vehicle amount driven by an engine and a motor.

Illustratively, in a transmission mounted electric device (TMED) of parallel hybrid vehicles, the engine and the driving motor are connected with each other by an engine clutch, and the motor shaft is connected with the input shaft of the transmission. Here, as an example, the transmission may be a dual clutch transmission (DCT). In addition, a start motor/generator or so-called hybrid starter generator (HSG) is connected to the engine to start the engine and if necessary generate electric power to charge the battery.

The main driving modes of the hybrid vehicle include an electric vehicle (EV) mode in which the power of the motor is solely used to drive the hybrid vehicle, a hybrid electric vehicle (HEV) mode in which torque of the engine is used as a main power source for driving the vehicle, and a regenerative braking (RB) mode in which braking or inertial energy is recovered through the driving motor while the vehicle being braked or running by its own inertia.

For example, as the driver depresses the accelerator pedal after starting the vehicle, the vehicle is driven in a state (i.e., EV mode) where the engine clutch is in the open state, and the starter generator operates and drives the engine when the vehicle gradually requires more driving power while it slowly accelerates. When the rotational speeds of the engine and the motor become the same, the engine clutch is engaged such that the engine and the motor together or the engine drives the vehicle, in other words, the drive mode is shifted from the EV mode to the HEV.

Generally, when the EV mode changed to the HEV mode, the engine and the motor are connected upon the engine clutch being switched from the open state to a non-slip connection state after the engine and the motor are synchronized. Here, when the engine clutch is switched to the connection state in a state where the rotation speed of the engine is equal to or less than the stall prevention minimum speed, the stop of the rotation (i.e. stall) of the engine may occur due to the load through the motor, and thus the synchronization is generally set to be achieved at a speed equal to or greater than the stall prevention minimum speed of the engine.

However, when the vehicle is climbing up a hill at a low-speed or the state of charge (SOC) is low, the engine clutch is connected in a slip state so that the engine power is transmitted to the wheels. For the reason, a dog clutch cannot be used as the engine clutch, and a friction-type clutch (hereinafter referred to simply as 'a friction clutch') is generally used.

SUMMARY

In a hybrid vehicle with a dual clutch transmission, maintaining the engine clutch as a friction clutch as in the prior art is disadvantageous in terms of cost compared to the engine clutch of a dog clutch.

In a hybrid vehicle with a dual clutch transmission, if a dog clutch is applied as the engine clutch, connecting the engine clutch in a slip state cannot be achieved and therefore it causes a problem in the hill-climbing at a low speed and the driving in a low SOC.

Further, in the case of the dog clutch, the issue of baulking may occur, and a technology for releasing the baulking without deterioration of drivability or in an impact-reduced method is required.

Various aspects of one embodiment of the present disclosure are directed to solving at least one problem as described above.

A controlling method, according to an embodiment of the present disclosure, for a vehicle which comprises an engine, a driving motor connected with the engine, a first clutch connected between the engine and the driving motor, a start motor connected with the engine, a transmission connected with the driving motor, and a second clutch connected between the driving motor and the transmission, comprises synchronizing speeds of the engine and the driving motor, and adjusting a torque of the start motor to release baulking which occurs while a connection state of the first clutch is switched to another connection state upon the speeds of the engine and the driving motor being synchronized.

In at least one embodiment of the present disclosure, a torque of the drive motor is additionally adjusted to release the baulking.

In at least one embodiment of the present disclosure, the torque of the driving motor is reduced and the torque of the start motor is increased to release the baulking.

In at least one embodiment of the present disclosure, an amount of increase in torque of the start motor is equal to an amount of decrease in torque of the drive motor.

In at least one embodiment of the present disclosure, the torque of the driving motor is adjusted to a first value, and then the torque of the driving motor is adjusted to a second value when the baulking is not released with the first value.

In at least one embodiment of the present disclosure, the torque of the driving motor is increased and the torque of the start motor is decreased to release the baulking.

In at least one embodiment of the present disclosure, the torque of the start motor is adjusted to a third value, and then the torque of the start motor is adjusted to a fourth value when the baulking is not released with the third value.

In at least one embodiment of the present disclosure, the second clutch is switched to a slip connection state during the adjusting of the torque of the start motor.

In at least one embodiment of the present disclosure, the second clutch is switched to a lock state after the baulking is released.

In at least one embodiment of the present disclosure, the method further comprises determining whether the baulking occurs or is released according to a stroke of a disconnector of the first clutch.

A hybrid vehicle, according to an embodiment of the present disclosure, comprises: an engine; a driving motor connected with the engine; a first clutch connected between the engine and the driving motor; a start motor connected with the engine; a transmission connected with the driving motor; a second clutch connected between the driving motor and the transmission; and a controller is configured to: synchronize speeds of the engine and the driving motor, and adjust a torque of the start motor to release baulking which occurs while a connection state change of the first clutch is switched to another connection state upon the speeds of the engine and the driving motor being synchronized.

In at least one embodiment of a vehicle, the controller is further configured to adjust a torque of the drive motor to release the baulking.

In at least one embodiment of a vehicle, the controller is configured to reduce the torque of the driving motor and increase the torque of the start motor to release the baulking.

In at least one embodiment of a vehicle, an amount of increase in torque of the start motor is equal to an amount of decrease in torque of the drive motor.

In at least one embodiment of a vehicle, the torque of the drive motor is adjusted to a first value and then the torque of the drive motor is adjusted to a second value when the baulking is not released with the first value.

In at least one embodiment of a vehicle, the controller increases the torque of the driving motor and decreases the torque of the start motor to release the baulking.

In at least one embodiment of a vehicle, the controller is further configured to switch the second clutch to a slip connection state while adjusting the torque of the start motor.

In at least one embodiment of a vehicle, the second clutch is switched to a lock state after the baulking is released.

In at least one embodiment of a vehicle, the controller is further configured to determine whether the baulking occurs and/or is released according to a stroke of a disconnector of the first clutch.

Also, a non-transitory computer-readable storage medium, according to an embodiment of the present discloser, stores instructions by being executed by a controller in a vehicle which comprises an engine, a driving motor connected with the engine, a first clutch connected between the engine and the driving motor, a start motor connected with the engine, a transmission connected with the driving motor, and a second clutch connected between the driving motor and the transmission, to cause the controller to synchronize speeds of the engine and the driving motor, and adjust a torque of the start motor to release baulking which occurs while a connection state change of the first clutch is switched to another connection state upon the speeds of the engine and the driving motor being synchronized.

In a hybrid vehicle where a dual clutch transmission is applied, a dog clutch can be applied as the engine clutch unlike the prior art.

In addition, when baulking of the dog clutch is released, the issue of deteriorating of drivability due to an impact incurred by an unintended increase in torque is solved, the release of baulking can be achieved more rapidly, further alleviating the impact.

DETAILED DESCRIPTION

Hereinafter, embodiments disclosed in the present specification will be described in detail with reference to the accompanying drawings, in which the same or similar elements are given the same reference numerals regardless of the reference numerals, and redundant descriptions thereof will be omitted.

A suffix "unit" of an element used in the following description is given or combined in consideration of the cate of description and does not necessarily need to be physically divided or separated. For example, the "oo unit" may be an element that performs a function different from the "xx unit", but it may be implemented in a way that the functions are not physically separated or divided rather performed in parallel or chronologically in one microprocessor, and the suffix "unit" does not exclude the "oo unit". This is also applied to the suffix "module".

Further, in describing the embodiments disclosed herein, when it is determined that the detailed description of the related, known technology may obscure the essentials of the embodiments disclosed herein, the detailed description thereof will be omitted.

Further, it should be understood that the accompanying drawings are merely for easily understanding the embodiments disclosed in the present specification, and the technical concept disclosed in the present specification is not limited by the accompanying drawings, and all changes and equivalents included in the concept and technical field of the present disclosure are included.

Terms including ordinals such as "first", "second", and the like can be used to describe various elements, but the elements are not limited by the terms. The terms are used only for the purpose of distinguishing one element from another element, and in particular, the terms should not be construed as having only the name and determining the order among the elements.

It should be further understood that the criteria for "up/above" or "down/below" are merely used in principle to represent the relatively positional relationship among the elements with respect to the appearance shown in the drawings for convenience, and should not be understood to limit the position of the actual elements, so long as they are not naturally determined from each attributes or among the elements or otherwise expressed in the specification. For example, "B located above A" is merely an indication that B is shown above A in the drawings, unless otherwise stated or B should be located above A due to the properties of A or B, and B may be located below A or B and A may be horizontally disposed in the actual product or the like.

The term "and/or" is used to include all instances of any combination among a plurality of items to be covered. For example, "A and/or B" includes all three cases such as "A", "B", and "A and B".

When it is stated that an element is "connected" or "linked" to another element, it should be understood that the element may be directly connected or linked with another element, but another element may exist in between. On the other hand, when it is mentioned that an element is "directly connected" or "directly linked" to another element, it should be understood that another element does not exist in between.

An expression in the singular includes a plurality of expressions unless the context clearly indicates otherwise.

It should be understood that the term "include" or "have" used herein is intended to designate the presence of a feature, a number, a step, an operation, a component, a part or a combination thereof described in the specification, but it does not preclude the presence or addition of one or more other features, numbers, steps, operations, components, parts or combinations thereof.

Unless defined otherwise, all terms used herein, including technical or scientific terms, have the same meaning as that generally understood by those skilled in the art. The terms, such as those defined in commonly used dictionaries, will further be understood and should be interpreted as having a meaning that is consistent with their meaning in the context of the relevant art and will not be interpreted in an ideal or overly formal sense unless expressly defined herein.

In addition, a unit or a control unit is a term widely used for naming a controller that outputs a control value or command for a specific function to other elements, but it is not limited to a generic function unit. For example, each unit or control unit may include a memory for storing input/output devices for transmitting/receiving signals to/from other controllers or sensors, an operating system, logic commands, input/output information, etc., and one or more microprocessors for performing determination, calculation, determination, etc., which are required for controlling a function in charge.

Figure 1:
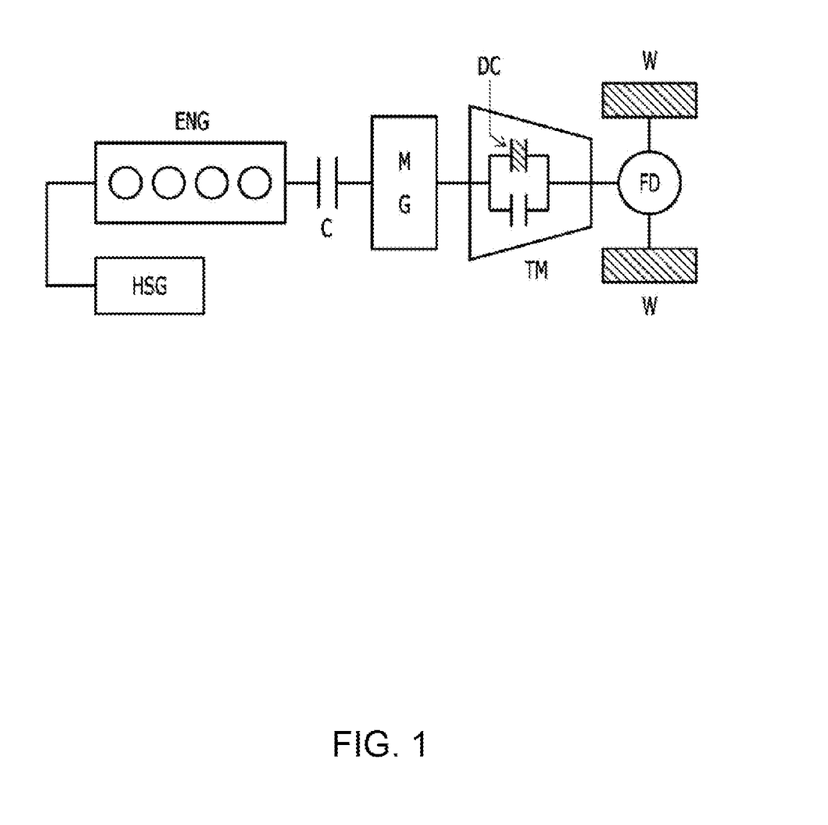
FIG. 1 illustrates power motion system diagram conduction of a hybrid vehicle according to an embodiment of the present disclosure.
Figure 2:
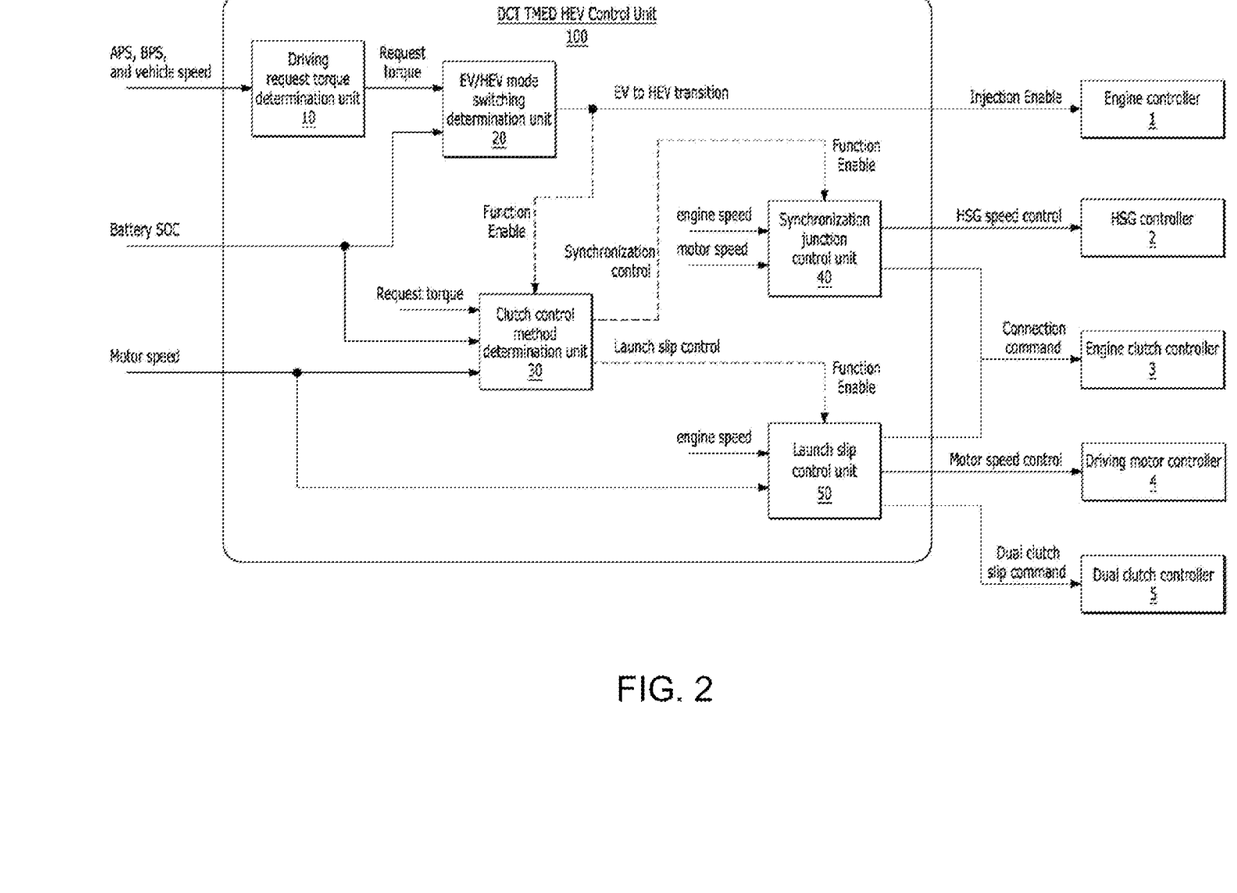
FIG. 2 is a control system diagram of a hybrid vehicle according to an embodiment of the present disclosure.

Prior to the detailed description of the embodiment of the present disclosure, FIG. 1 illustrates a power transmission system of a hybrid vehicle according to an embodiment of the present disclosure, and FIG. 2 illustrates a control system of a hybrid vehicle according to an embodiment of the present disclosure.

In a hybrid vehicle according to an embodiment of the present disclosure, as shown in FIG. 1, an engine ENG and a drive motor MG are connected with an engine clutch (first clutch) C interposed in between, the drive motor MG is connected with a dual clutch (second clutch) DC of a dual clutch transmission DCT, and the dual clutch transmission DCT is connected with a final drive FD and a wheel W. Further, a starter generator (HSG) is connected to the engine ENG.

In this embodiment, the engine clutch C is a dog clutch, and the dual clutch DC includes a multi-plate clutch as one of friction clutches.

Although not shown in drawings, the dual clutch DC may be connected with the hydraulic actuator. A clutching connection force of the dual clutch DC is determined according to the operating pressure of the hydraulic actuator, and a transmission torque through the dual clutch DC is determined, accordingly.

When the torque of the driving motor MG is input more than the transmission torque of the dual clutch DC, the dual clutch DC slips and transmits only the transmission torque among the input torques of the driving motor MG to the dual clutch transmission DCT.

Depending on the controlling of the operating pressure of the hydraulic actuator, the dual clutch DC may be maintained in any of disconnected, slip-connected, and non-slip-connection states. Further, in the slip-connection state, the delivery torque of the dual clutch DC may be determined depending on operating pressure of the actuator.

Hereinafter, a vehicle control process according to an embodiment of the present disclosure will be described in reference to FIG. 2.

First, the vehicle controller 100 includes a drive request torque determination unit 10, an EV/HEV mode switching determination unit 20, a clutch control method determination unit 30, a synchronization junction control unit 40, and an oscillation SL control unit 50.

The drive request torque determination unit 10 receives information such as an accelerator pedal signal APS, a brake pedal signal BPS, and a vehicle speed, etc. that determines the drive request torque.

The determined driving request torque is input to the EV/HEV mode switching determination unit 20, and the EV/HEV mode switching determination unit 20 determines whether the driving request torque exceeds a first reference value.

At this time, if it is determined that the driving request torque exceeds the first reference value, the EV/HEV mode switching determination unit 20 determines the mode switching from the EV mode to the HEV mode.

The EV/HEV mode change determination unit 20 outputs the mode change decision to the engine controller 1, and the engine controller 1 starts and controls the engine ENG, accordingly.

Simultaneously, the mode change decision is input to the clutch control method determination unit 30, and the clutch control method determination unit 30 determines the clutch control method for the HEV mode change.

In order to determine the clutch control method, the clutch control method determination unit 30 determines one of the condition of whether the input side speed of the transmission (DCT) is higher than the stall prevention minimum speed of the engine ENG (the first condition), whether the input side speed of the transmission (DCT) is equal to or lower than the stall prevention minimum speed of the engine ENG, and whether it is possible to raise the input side speed of the transmission (DCT) to the stall prevention minimum speed of the engine ENG by the available torque of the driving motor MG, i.e. the sufficiency of the electric driving force (the second condition).

In the second condition, the available torque of the drive motor MG may be determined based on the maximum torque of the drive motor MG and the battery SOC state. For example, when the SOC of the battery is sufficient, the available torque of the driving motor MG may be the maximum torque of the driving motor. Additionally, in a case where the SOC of the battery is not sufficient, the available torque of the driving motor MG may be a value smaller than the maximum torque thereof.

In determining the available torque, the battery SOC state may be based on the current SOC state of the battery, but the amount of charge that can be charged in the battery by generating power with the starter generator HSG using a part of the engine ENG power may also be considered.

For example, wherein the synchronization junction control, when the driving request torque is not large, the available torque may be determined by additionally considering the available battery charging amount through the starter generator (HSG) in the battery SOC state. That is, for example, when the driving request torque is less than a reference value, the chargeable amount through the starter generator (HSG) will be added.

Also, the second condition may further consider whether the vehicle is smoothly accelerating. When the load of the vehicle is large or the vehicle load is large such as high plate driving, it may be difficult to accelerate the vehicle only by the driving motor MG due to the load even though the electric driving force is sufficient. Therefore, the issue of whether the vehicle acceleration smoothly proceeds is additionally considered in order to respond to such case.

Whether acceleration of the vehicle is being smoothly performed may be determined based on whether acceleration of an input of the DCT is equal to or greater than the reference value.

In this embodiment, it is not necessary to separately calculate the vehicle load, and it is possible to overcome a situation where it is difficult to calculate the accurate vehicle load, considering whether the acceleration of the vehicle is smoothly progressing without directly considering the vehicle load.

If it is determined that the condition corresponds to either the first condition or the second condition, a synchronization control command is output from the synchronization junction control unit 40.

The synchronization junction control unit 40 receives the information on the speed of engine ENG and the speed of the driving motor and controls the synchronization junction which is the performance of control for maintaining the connection state of the engine clutch C after the synchronization of the speed of the driving motor controlling the engine speed.

The synchronization junction control section 40 may, illustratively, may output an instruction for speed control to the starter generator (HSG) controller 2 to synchronize the engine ENG speed to the driving motor speed.

Further, as the synchronization of the engine ENG speed and the driving motor speed is achieved, a command related to the control of the engine clutch C may be the output to the engine clutch controller 3, and the engine clutch controller 3 controls the engine clutch C to be switched from the open state to the connection state according to the command.

After the engine clutch C is switched to the connection state, the output of the engine ENG is increased, and the torque of the drive motor MG is reduced. In this case, the torque of the engine ENG and the torque of the driving motor MG may be controlled depending on the power distribution ratio set for the engine ENG and the driving motor MG.

In the present embodiment, the speed of the engine ENG is controlled by the rotation of the starter generator HSG, but the present disclosure is not limited thereto, and the speed of the engine ENG may be directly controlled by the driving of the engine ENG through the adjustment of the fuel injection amount.

Figure 3:
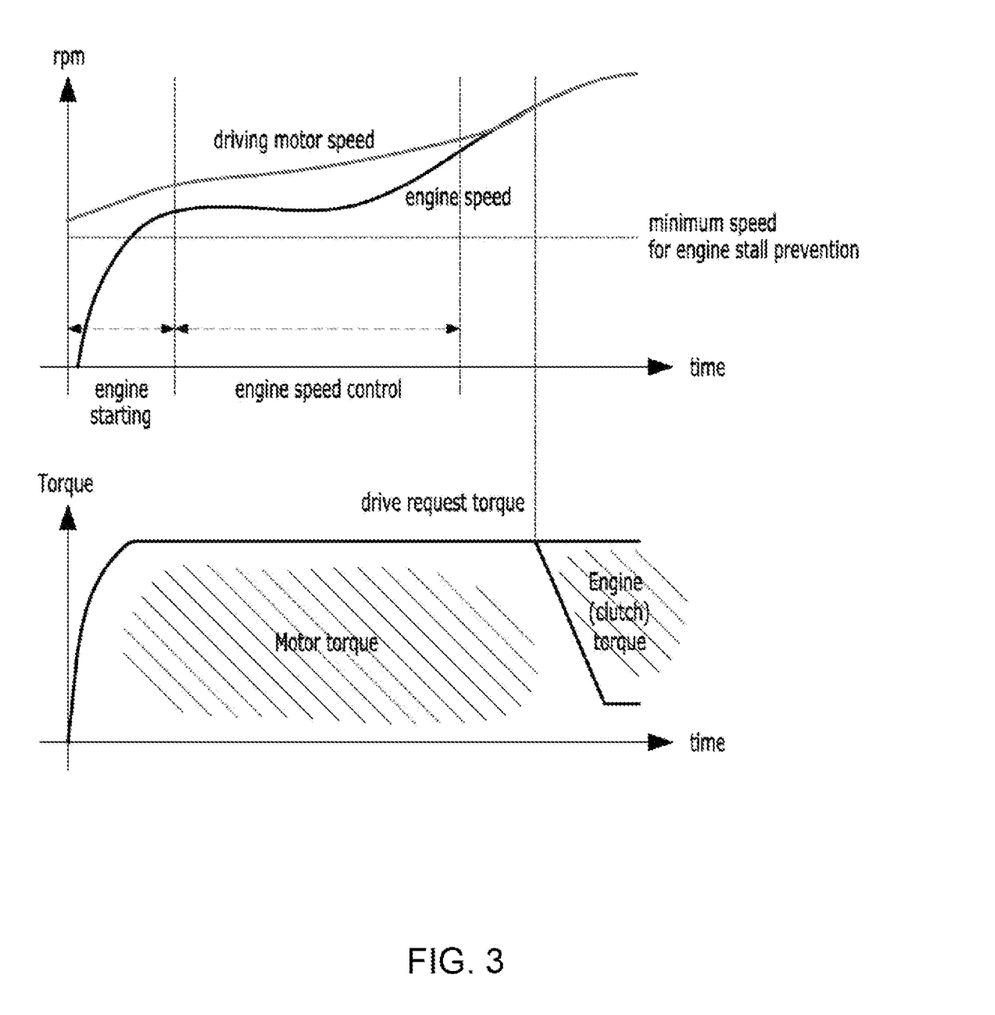
FIG. 3 is an example of synchronization junction control.

FIG. 3 shows the speed of the driving motor MG and the speed of the engine ENG according to the time in the above-described synchronization junction control process, and this case also shows the relationship between the driving request torque and the torque of the driving motor MG and the engine ENG.

As shown in FIG. 3, in the synchronization connection control process, until the engine clutch C is switched to the connection state and the power of the engine ENG is used as the power source for driving the vehicle, the driving motor MG is entirely in charge of the power for driving the vehicle. While the driving motor MG is controlled to entirely bear the driving request torque, e.g. when the engine clutch C is maintained in the release state, the engine ENG is controlled to increase the speed to a speed equal to or higher than a minimum speed where the engine ENG is prevented from stall after starting.

When synchronization is achieved in such instance, the engine clutch C is switched from the disconnection state to the connection state, and accordingly the torque of the engine ENG is used as the main power source for driving the vehicle. As described above, after the engine clutch C is switched to the connection state, the torque of the engine ENG and the torque of the driving motor MG may be controlled according to the power distribution ratio set for the engine ENG and the driving motor MG.

When neither the first condition nor the second condition is satisfied, the clutch control method determination unit 30 determines the launch slip control, and accordingly, the launch slip control unit 50 performs the launch slip control. Hereinafter, the launch slip control will be described in detail with reference to FIG. 4.

Figure 4:
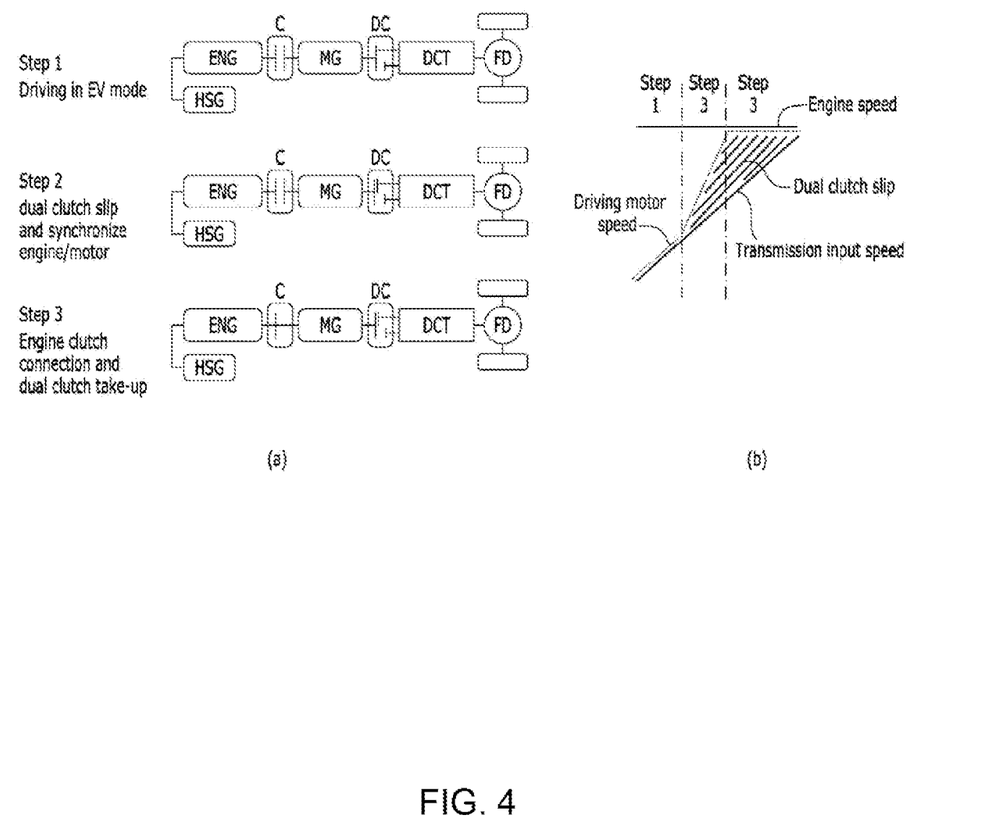
FIG. 4 is an example of slip control.

First, it is determined whether the synchronization with the engine ENG speed is possible through the speed control of the driving motor MG. For such determination, it determines whether the available torque of the driving motor MG is larger than the sum of the required torque for speed synchronization The available torque of the drive motor MG may be determined based on the maximum torque of the drive motor MG and the battery SOC state as described above. Likewise, the available battery charge amount through the HSG may be considered together with the battery SOC state.

The torque required for the speed synchronization, for instance, may be calculated as a torque required to increase the speed of the driving motor MG to a speed equal to or higher than the minimum stall prevention speed of the engine ENG within a predetermined time (i.e, a target time for achieving synchronization of the engine ENG and the driving motor MG).

If the available torque of the driving motor MG is sufficient, the launch slip control is performed.

To this end, the launch slip control unit 50 outputs a command for controlling the coupling force of the dual clutch to the dual-clutch control unit 5 for the launch slip control and outputs a command for controlling the speed of the drive motor MG to the drive motor control unit 4 for the synchronous control.

Illustratively, the launch slip controller as an launch slip control command 50 may output a control command to decrease the coupling force of the transmission torque of the dual clutch DC so that the transmission torque of the dual clutch DC reaches the driving request torque to the dual clutch controller 5. In addition, the dual clutch controller 5 controls the dual clutch actuator to drop the operating pressure of the dual clutch according to the control command.

Also, the launch slip controller 50, for example, may use the speed information of the input engine speed and the driving motor MG for following the engine ENG speed, and may output speed control commands of the driving motor MG for synchronization. For instance, until the engine ENG speed reaches the stall prevention speed and is maintained for a predetermined period of time, the driving motor MG is controlled to follow the speed of the engine ENG to be synchronized.

Alternatively, the launch slip controller 50 may receive, for example, the engine ENG speed information, determine a target time for synchronizing the speed of the drive motor MG with the engine ENG speed at a stall prevention minimum speed or higher of the engine ENG and a torque of the drive motor MG required for achieving synchronization within the target time as a motor control command, and transmit the motor control command to the driving motor controller 4.

The driving motor controller 4 controls the drive motor MG according to the above-described control command to achieve synchronization.

Since the transfer torque of the dual clutch DC is adjusted to the drive request torque, the torque part subtracted from the drive request torque among the torque output from the drive motor MG is used to increase the speed of the drive motor MG.

When the speed synchronization between the engine ENG and the driving motor MG is achieved, the launch slip control unit 50 outputs a connection command for the engine clutch C to the engine clutch control unit 3, and the engine clutch control unit 3 controls the engine clutch C to be switched to a connection state according to the output command.

FIG. 4 illustrates the control states of the engine clutch C and the dual clutch DC during the above-described launch slip control process.

As shown in FIG. 4A, the engine clutch C is in a disconnection state and the dual clutch DC is in a non-slip connection state during an EV mode, and as shown in FIG. 4B, the speed of the driving motor MG is the same as the speed of the input side of the transmission DCT, and the speed of the engine ENG is independent of the speed of the driving motor MG (step 1).

By performing the launch slip control, while the engine clutch C is maintained in the disconnection state, the dual clutch DC is switched to the slip-connection state while its delivery torque is controlled to drop to the drive request torque, and accordingly, the speed of the drive motor MG reaches the speed of the engine ENG while rising above the speed of the input side of the transmission DCT (step 2).

As the speed of the drive motor MG reaches the speed of the engine ENG and synchronization is achieved, the engine clutch C is transitioned to the connection state, whereby the engine ENG and the drive motor MG rotate together. At this time, the engine ENG and the driving motor MG are controlled to achieve the driving request torque together depending on the set power distribution ratio, the dual clutch DC may be continuously controlled so that the previous torque is adjusted to the driving request torque, and as time passes, the transmission torque of the dual clutch DC is increased to be in a non-slip connection state, and the speed of the engine ENG, the speed of the driving motor MG, and the speed of the input side of the transmission DCT become the same (step 3).

Figure 5:
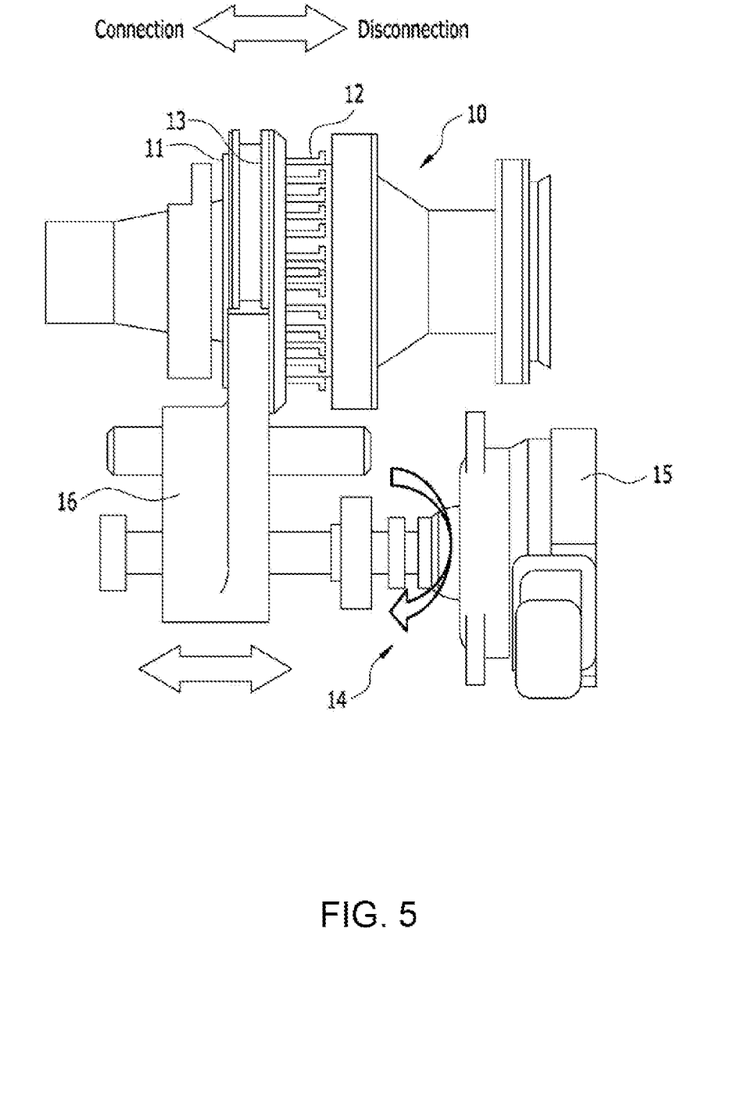
FIG. 5 illustrates a dog clutch as an example of an engine clutch according to the present embodiment.

FIG. 5 illustrates a dog clutch as an example of an engine clutch according to the present embodiment.

The dog clutch includes a disconnector 10, and the disconnector 10 includes a shaft gear 11 provided to be integrally rotated with an engine shaft, a hub 12 provided to be integrally rotated with a driving motor shaft, and a sleeve 13 coupled to the hub 12 so as to be integrally rotated with the hub if the sleeve is slidable in an axial direction.

Here, each of the shaft gear 11 and the hub 12 may include an outer spline formed to be elongated along the axial direction on the outer circumferential surface thereof, and the sleeve 13 may include an inner spline corresponding thereto.

The sleeve 13 is integrally rotated in regular connection with the hub 12, and is slid axially from the hub 12 to engage or disengage the shaft gear 11, thereby selectively coupling the hub 12 and the shaft gear 12.

For sliding movement of the sleeve 13, the disconnector 10 may illustratively include a drive mechanism 14 including a disconnect motor 15 and a fork 16 that moves linearly through a ball screw connection by rotation of the disconnect motor 15. The fork 16 is linearly moved by rotation of the disconnector motor 15, and thus the sleeve 13 connected with the fork 16 is linearly moved together.

The component, i.e., the sleeve 13 or the fork 16, moved in the axial direction from the disconnector motor 15 for engaging and disengaging the disconnector may be controlled as a stroke, and the stroke may be determined through the hole sensor 21 mounted on the disconnector motor 15.

Figure 6:
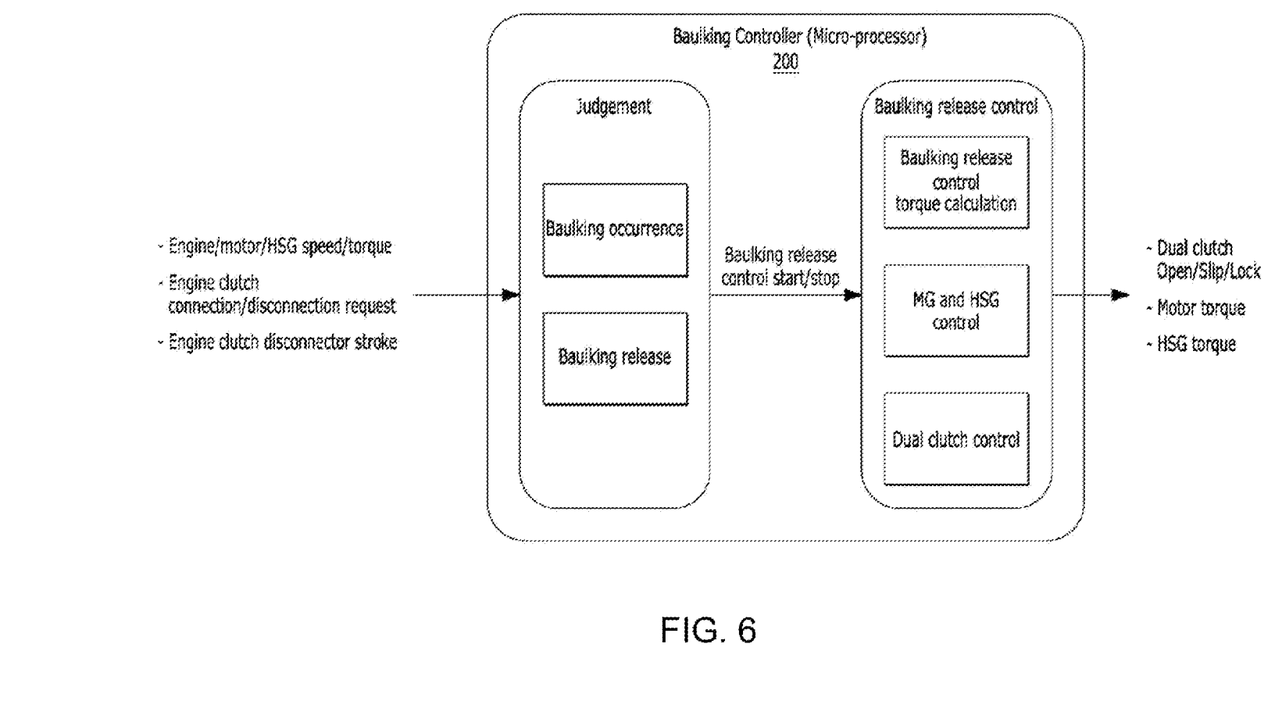
FIG. 6 schematically conceptually illustrates a baulking controller and a control process thereof according to an embodiment of the present disclosure.
Figure 7:
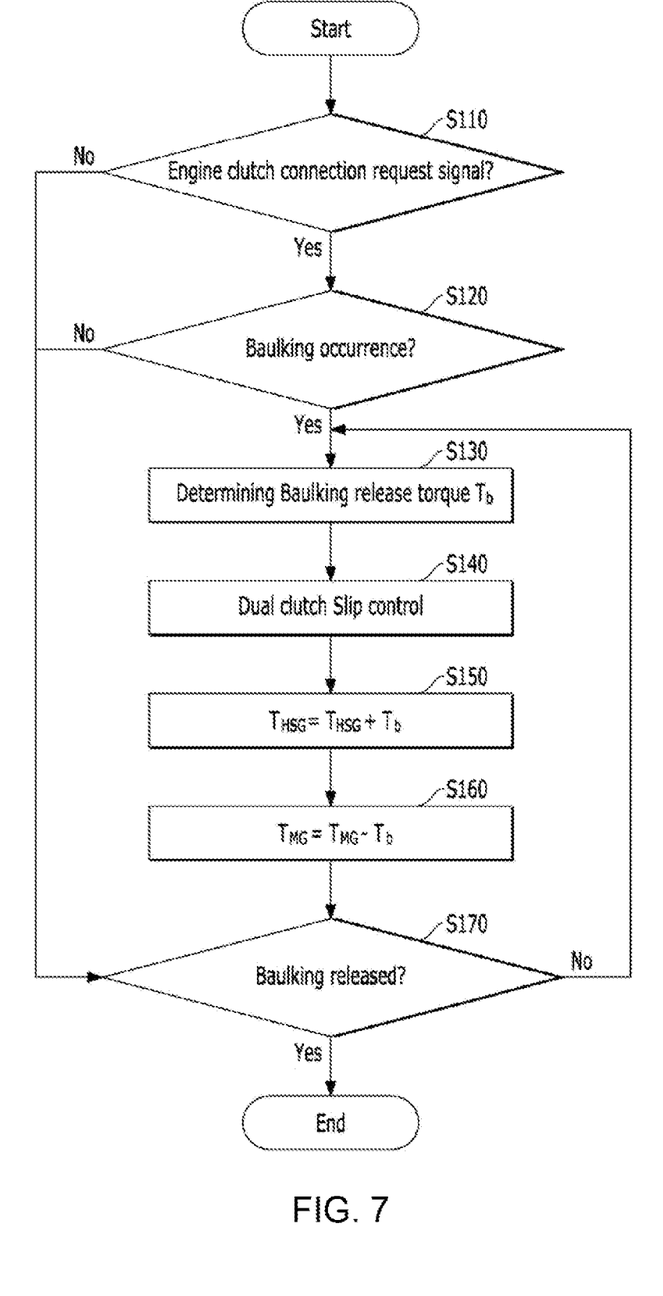
FIG. 7 shows a flowchart of an embodiment for the control process of FIG. 6.

FIG. 6 conceptually illustrates a baulking controller and its control and process according to an embodiment of the present disclosure, and FIG. 7 illustrates a flowchart of an embodiment for the control process.

As illustrated in FIG. 6, the baulking controller 200 of the present embodiment may determine whether baulking occurs depending on the execution of the commands stored in a memory, and may include at least one microprocessor for resolving the baulking resolution thereof, and may include an input/output interface (not shown).

The baulking controller 200 receives the speeds and torques of the engine ENG, the driving motor MG and the starter generator HSG through an input/output interface. In addition, the baulking control unit 200 may receive stroke information of the disconnector 10 according to connection control of the engine clutch C.

As described above, the stroke information of the disconnector 10 may be obtained through the moving distance of the sleeve 13 or the fork 16 according to the rotation of the disconnector motor 15 by the control of the engine clutch controller 3 depending on the connection request of the engine clutch C.

When a connection request signal (i.e., a "connection command" in FIG. 2) of the engine clutch C is generated (S110), it may be determined whether the baulking is generated through the stroke information of the disconnector 10 (S120).

Herein, for instance, the determination whether the baulking occurs may include a determination whether the stroke of the disconnector 10 is less than a set value. For example, when the disconnector stroke 10 is less than a predetermined value, it may be determined that the linear movement of the sleeve 13 does not reach the amount of connection with the shaft gear 11, and thus, it may be determined that the baulking has occurred.

Illustratively, if the baulking occurs (as Yes in S110), that is, when the stroke of the disconnector 10 is less than the set value illustratively, the baulking controller 200 may give "on" to the baulking flag indicating whether the baulking occurred, and when the baulking does not occur, the baulking flag is given "off".

If it is determined that the baulking has occurred, the baulking controller 200 controls the baulking release.

For this instance, a baulking release torque is initially determined (S130).

When the baulking release torque is determined, the torque of the starter generator HSG is increased by the baulking release torque (S150), and the torque of the driving motor MG is decreased by the baulking release torque (S160).

The torque of the starter generator HSG and the torque of the driving motor MG, which are newly determined for releasing the baulking, may be transmitted to the HSG controller 2 and the driving motor controller 4, respectively. The starter generator HSG and the drive motor MG output the changed torques according to the control of the HSG controller 2 and the driving motor controller 4, respectively; and if the baulking release torque is sufficient, the baulking will be released, otherwise, they may still be in the baulking state.

Here, whether or not to release the baulking may be determined by the stroke of the disconnector 10, like the determination of whether or not the baulking occurs (S170). That is, for example, when the stroke of the disconnector 10 is equal to or greater than the predetermined value, the baulking may be determined to be released, or otherwise, the baulking may yet be determined in the baulking state.

When the baulking is not released (as No in S170), the steps S130 to S160 may continuously be performed until the baulking is released while gradually increasing the baulking release torque.

When the torques of the starter generator HSG and the driving motor MG are changed to release the baulking, the dual clutch DC may be switched to the slip state (S140).

Here, the baulking release torque may be obtained through an experiment depending on the driving situation, and may be stored in a memory in the form of a baulking release torque map.

Figure 8:
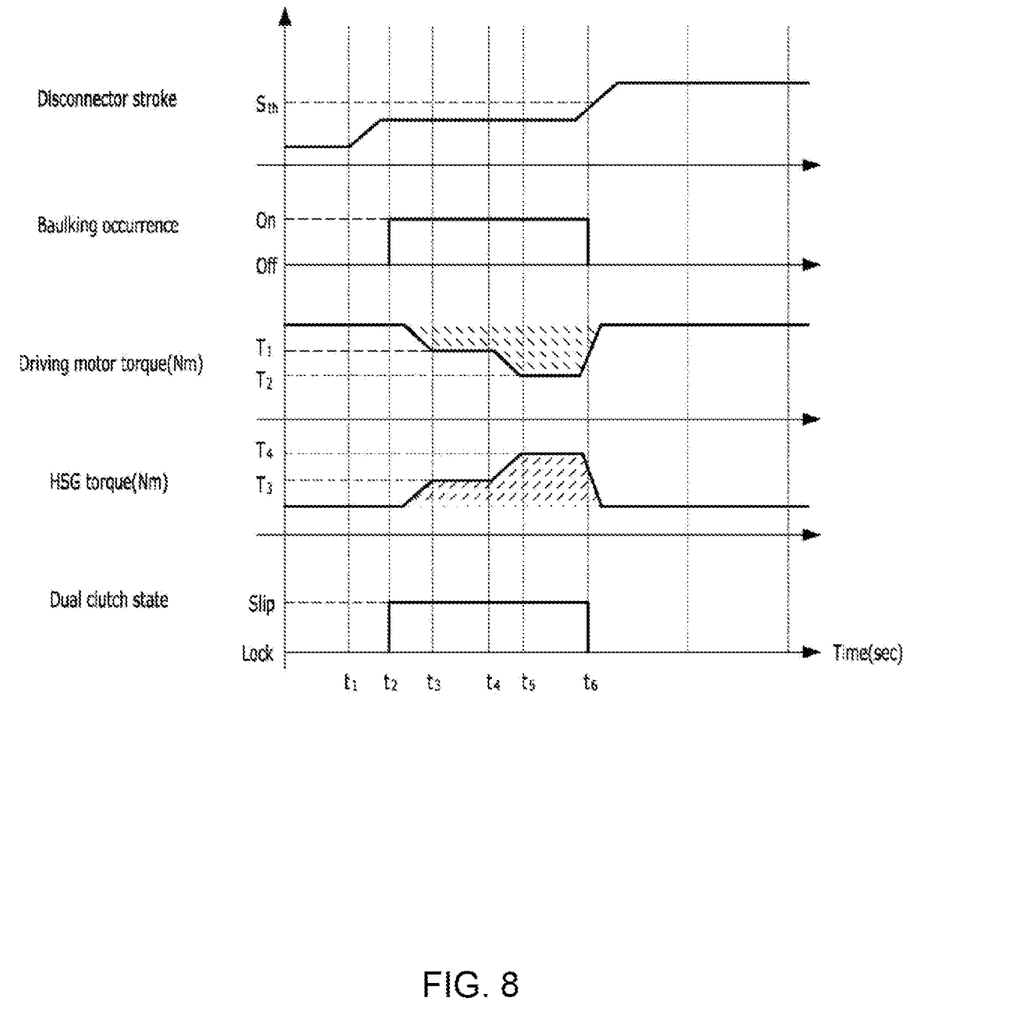
FIG. 8 illustrates a disconnector stroke, whether the occurrence of a baulking has occurred, a drive motor torque, a starter generator torque, a dual clutch state, etc. during control of an embodiment of the present disclosure.

FIG. 8 illustrates the disconnector 10 stroke, the occurrence of baulking, the drive motor MG torque, the starter generator HSG torque, the phase of the dual clutch DC during the control of the present embodiment, etc.

Referring to FIG. 8, after the engine clutch stopping device 3 transmits a control signal to the disconnector motor 15 in order to change the engine clutch C into the connection state depending on the command to connect the engine clutch C (t1), it is determined that the stroke of the disconnector 10 received as a result of the operation of the disconnector motor 15 does not reach the set value Sth, the occurrence of the baulking is determined. In this case, as described above, "on" may be given to the baulking flag to indicate the occurrence of baulking (t2).

As a result, the torque of the driving motor MG is decreased by the determined baulking release torque to be adjusted to T1, and the torque of the starter generator HSG is increased by the determined baulking release torque to be adjusted to T3 (t2 to t3). At this time, the dual clutch DC is switched to the slip state and controlled (t2).

In spite of such torque control, when the baulking is not released, that is, when the stroke of the disconnector 10 still does not reach the predetermined value Sth, the baulking release torque is additionally determined (t3 to t4), and accordingly, the torque of the driving motor MG is further decreased to be adjusted to T2 and the starter generator HSG is further increased to be adjusted to T4 (t4 to t5).

When the baulking is released, that is, when the stroke of the disconnector 10 reaches the predetermined value (t6), the baulking flag is switched to "off", and accordingly, the torque of the driving motor MG and the torque of the starter generator HSG, which have been adjusted for the baulking resolution, are reverted to their original states. Then, the dual clutch DC is switched back to the lock state (t6).

In the present embodiment, it may have been described that when the torque of the driving motor MG is decreased by the baulking release torque, the driving motor MG is increased and the torque of the starter generator HSG is increased to release the baulking, but the present disclosure is not necessarily limited thereto, and vice versa.

Figure 9:
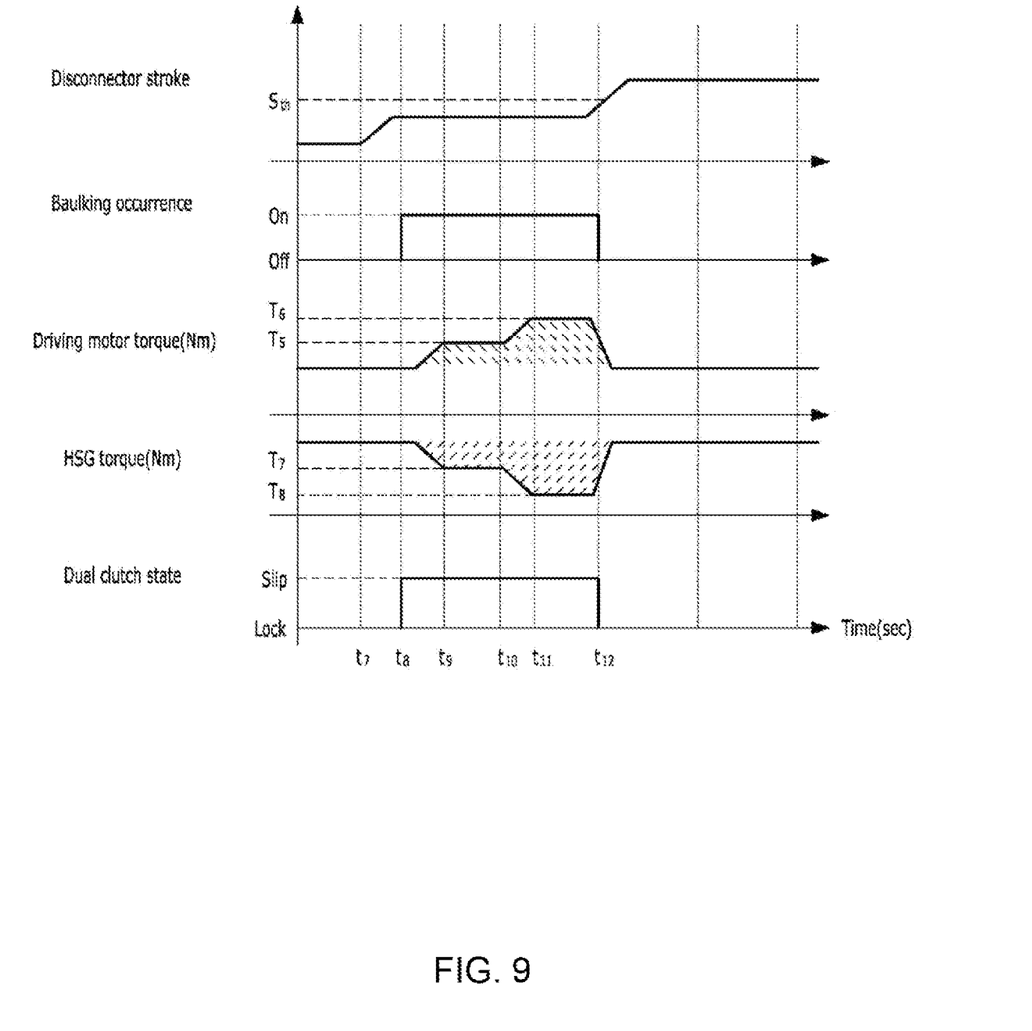
FIG. 9 illustrates a disconnector stroke, the occurrence of whether a baulking foot occurs, a drive motor torque, a starter generator torque, a dual clutch state, and the like during control of another embodiment of the present disclosure.

That is, as shown in FIG. 9, after the engine clutch controller 3 transmits a control signal to the disconnector motor 15 in order to change the engine clutch C into the connection state depending on the command to connect the engine clutch C (t7), when it is determined that the stroke of the disconnector 10 received as a result of the operation of the disconnector motor 15 does not reach the set value Sth, the occurrence of baulking is determined. In this case, as described above, in order to indicate the occurrence of baulking, "on" may be assigned to the balking flag (t8).

As a result, the driving motor MG torque is increased by the determined baulking release torque to be adjusted to T5, and the starter generator HSG is decreased by the determined baulking release torque to be adjusted to T7 (t8 to t9). At this time, the dual clutch DC is switched to the slip state and controlled (t8).

In spite of such torque control, when the baulking is not released, that is, when the stroke of the disconnector 10 still does not reach the predetermined value Sth, the baulking release torque is determined again (t9 to t10), and accordingly, the torque of the driving motor MG is further increased to be adjusted to T6 and the torque of the starter generator HSG is further decreased to be adjusted to T8 (t10 to t11).

When the baulking is released, that is, when the stroke of the disconnector 10 reaches the predetermined value (t12), the baulking flag is switched to "off", and accordingly, the torque of the driving motor MG and the torque of the starter generator HSG, which are adjusted for the baulking resolution, are reverted to the original state. Then, the dual clutch DC is switched back to the lock state (t12).

Meanwhile, the baulking controller may be implemented by a microprocessor separate from the vehicle controller, but is not necessarily limited thereto.

Illustratively, the baulking controller may be implemented to be integrated into the vehicle controller. For example, the functions of the vehicle controller and the above-mentioned baulking controller may be integrated into one microprocessor.

When only the output increase control of the driving motor MG is executed in order to solve the baulking, drivability may be deteriorated due to impact caused by an unintended increase in torque of the driver. However, in the present embodiment, the starter generator (HSG) torque is used in order for the problem be alleviated.

In addition, the dual clutch is switched to the slip state when the output torque is controlled, thereby more rapidly achieving the baulking resolution and further mitigating the impact.

In the embodiments described above, the drive request torque determination unit 10, the EV/HEV mode switching determination unit 20, the clutch control method determination unit 30, the synchronization junction control unit 40, the oscillation SL control unit 50, and the baulking controller may each comprise a non-transitory computer-readable storage medium storing instructions for performing its functionality described above by being executed by a processor (e.g., computer, microprocessor, CPU, ASIC, circuitry, logic circuits, etc.). Also, two or more of them may be integrated in one unit comprising one or more processors and one or more non-transitory computer-readable storage medium. According to an exemplary embodiment of the present disclosure, the vehicle controller 100, its components such as the drive request torque determination unit 10, the EV/HEV mode switching determination unit 20, the clutch control method determination unit 30, the synchronization junction control unit 40, the oscillation SL control unit 50, and the baulking controller (e.g., a baulking controller 200) may include a processor (e.g., computer, microprocessor, CPU, ASIC, circuitry, logic circuits, etc.) and an associated non-transitory memory storing software instructions which, when executed by the processor, provides the functionalities of them as described here. Herein, the memory and the processor may be implemented as separate semiconductor circuits. Alternatively, the memory and the processor may be implemented as a single integrated semiconductor circuit. The processor may embody one or more processor(s).

Also, Examples of the computer-readable medium include a hard disk drive (HDD), a solid-state drive (SSD), a silicon disk drive (SDD), a ROM, a RAM, a CD-ROM, a magnetic tape, a floppy disk, an optical data storage device, etc.

What is claimed is:

1. A method for controlling a vehicle which comprises an engine, a driving motor connected with the engine, a first clutch connected between the engine and the driving motor, a start motor connected with the engine, a transmission connected with the driving motor, and a second clutch connected between the driving motor and the transmission, the method comprising:
   synchronizing speeds of the engine and the driving motor; and
   adjusting a torque of the start motor to release baulking which occurs while a connection state of the first clutch is switched to another connection state upon the speeds of the engine and the driving motor being synchronized,
   wherein the torque of the start motor is adjusted to a first value, and then the torque of the start motor is adjusted to a second value when the baulking is not released with the first value.

2. The method of claim 1, wherein a torque of the drive motor is additionally adjusted to release the baulking.

3. The method of claim 2, wherein the torque of the driving motor is reduced and the torque of the start motor is increased to release the baulking.

4. The method of claim 3, wherein an amount of increase in torque of the start motor is equal to an amount of decrease in torque of the drive motor.

5. The method of claim 2, wherein the torque of the driving motor is adjusted to a third value, and then the torque of the driving motor is adjusted to a a fourth value when the baulking is not released with the third value.

6. The method of claim 2, wherein the torque of the driving motor is increased and the torque of the start motor is decreased to release the baulking.

7. The method of claim 1, wherein the second clutch is switched to a slip connection state during the adjusting of the torque of the start motor.

8. The method of claim 7, wherein the second clutch is switched to a lock state after the baulking is released.

9. The method of claim 1, further comprising determining whether the baulking occurs or is released according to a stroke of a disconnector of the first clutch.

10. A hybrid vehicle, comprising:
    an engine;
    a driving motor connected with the engine;
    a first clutch connected between the engine and the driving motor;
    a start motor connected with the engine;
    a transmission connected with the driving motor;
    a second clutch connected between the driving motor and the transmission; and
    a controller is configured to:
    synchronize speeds of the engine and the driving motor, and
    adjust a torque of the start motor to release baulking which occurs while a connection state change of the first clutch is switched to another connection state upon the speeds of the engine and the driving motor being synchronized,
    wherein the torque of the start motor is adjusted to a first value, and then the torque of the start motor is adjusted to a second value when the baulking is not released with the first value.

11. The hybrid vehicle of claim 10, wherein the controller is further configured to adjust a torque of the drive motor to release the baulking.

12. The hybrid vehicle of claim 11, wherein the controller is configured to reduce the torque of the driving motor and increase the torque of the start motor to release the baulking.

13. The hybrid vehicle of claim 12, wherein an amount of increase in torque of the start motor is equal to an amount of decrease in torque of the drive motor.

14. The hybrid vehicle of claim 11, wherein the torque of the driving motor is adjusted to a third value, and then the torque of the driving motor is adjusted to a fourth value when the baulking is not released with the third value.

15. The hybrid vehicle of claim 11, wherein the controller increases the torque of the driving motor and decreases the torque of the start motor to release the baulking.

16. The hybrid vehicle of claim 10, wherein the controller is further configured to switch the second clutch to a slip connection state while adjusting the torque of the start motor.

17. The hybrid vehicle of claim 16, wherein the second clutch is switched to a lock state after the baulking is released.

18. The hybrid vehicle of claim 10, wherein the controller is further configured to determine whether the baulking occurs and/or is released according to a stroke of a disconnector of the first clutch.

19. A non-transitory computer-readable storage medium storing instructions executed by a controller in a vehicle which comprises an engine, a driving motor connected with the engine, a first clutch connected between the engine and the driving motor, a start motor connected with the engine, a transmission connected with the driving motor, and a second clutch connected between the driving motor and the transmission, to cause the controller to synchronize speeds of the engine and the driving motor, and adjust a torque of the start motor to release baulking which occurs while a connection state change of the first clutch is switched to another connection state upon the speeds of the engine and the driving motor being synchronized, wherein the torque of the start motor is adjusted to a first value, and then the torque of the start motor is adjusted to a second value when the baulking is not released with the first value.

* * * * *